(12) United States Patent
Philbrook

(10) Patent No.: US 7,610,716 B2
(45) Date of Patent: Nov. 3, 2009

(54) COLLAPSIBLE CRUSTACEAN TRAP

(76) Inventor: Mark Christopher Philbrook, 2450 Bigrock Road, Sidney, British Columbia (CA) V8L 3Y7

( * ) Notice: Subject to any disclaimer, the term of this patent is extended or adjusted under 35 U.S.C. 154(b) by 0 days.

(21) Appl. No.: 11/961,721

(22) Filed: Dec. 20, 2007

(65) Prior Publication Data

US 2008/0092432 A1    Apr. 24, 2008

Related U.S. Application Data

(62) Division of application No. 11/285,994, filed on Nov. 23, 2005, now abandoned.

(60) Provisional application No. 60/631,070, filed on Nov. 26, 2004.

(51) Int. Cl.
*A01K 69/10* (2006.01)
*A01K 69/06* (2006.01)

(52) U.S. Cl. .............................. 43/105; 43/100; 43/4.5; 220/9.2; 135/126

(58) Field of Classification Search .................. 43/105, 43/100, 4.5; 220/9.2; 135/126, 128
See application file for complete search history.

(56) References Cited

U.S. PATENT DOCUMENTS

| | | | | |
|---|---|---|---|---|
| 664,926 A * | 1/1901 | Briggs | ......................... | 43/105 |
| 690,507 A * | 1/1902 | Zangenberg | ................. | 43/105 |
| 850,123 A * | 4/1907 | Algate | ......................... | 43/105 |
| 1,691,904 A * | 11/1928 | Gamble | ...................... | 220/9.2 |
| 1,985,177 A * | 12/1934 | Lawrence | .................... | 43/100 |
| 2,716,304 A * | 8/1955 | Taylor | ......................... | 43/100 |
| 2,814,899 A * | 12/1957 | Brosius | ......................... | 43/12 |
| 3,484,981 A | 12/1969 | Gilmer | | |
| 3,541,721 A * | 11/1970 | Sexauer | ....................... | 43/100 |
| 3,795,073 A * | 3/1974 | Olsen | ........................... | 43/105 |
| 3,960,161 A * | 6/1976 | Norman | ...................... | 135/126 |
| 3,990,463 A * | 11/1976 | Norman | ...................... | 135/126 |
| 4,021,956 A * | 5/1977 | Hogg | ............................ | 43/12 |
| 4,030,232 A * | 6/1977 | Niva | ............................ | 43/105 |
| 4,134,225 A * | 1/1979 | Welch | ......................... | 43/100 |
| 4,143,480 A | 3/1979 | Bott | | |
| 4,221,071 A | 9/1980 | Sjolund | | |
| 4,237,646 A * | 12/1980 | Mims, III | .................... | 43/105 |
| 4,354,325 A * | 10/1982 | Aho | ............................ | 43/105 |
| 4,538,376 A | 9/1985 | Morton | | |
| 4,554,760 A * | 11/1985 | Ponzo | ......................... | 43/105 |
| 4,604,823 A * | 8/1986 | Ponzo | ......................... | 43/105 |
| 4,706,409 A | 11/1987 | Downing | | |
| 4,723,371 A | 2/1988 | Williams | | |
| 4,825,892 A * | 5/1989 | Norman | ...................... | 135/126 |

(Continued)

FOREIGN PATENT DOCUMENTS

DE    19844036 A1 *    4/1999

(Continued)

*Primary Examiner*—Darren W Ark
(74) *Attorney, Agent, or Firm*—Smiths IP; Lawrence Chan

(57) ABSTRACT

An improved crustacean, fish & animal trap comprising a collapsible hoop and mesh structure to minimize storage size. The invention is unique in that it collapses through the manipulation of flexible hoops to a size minimized in all three dimensions. The primary configurations would be for crab, prawns and lobster/crayfish; however, in slightly different configurations, can be used to catch or cage animals, fish and other crustaceans. Another embodiment of the trap would feature only one hoop and would be used as a "lift trap."

17 Claims, 6 Drawing Sheets

U.S. PATENT DOCUMENTS

| | | | |
|---|---|---|---|
| 4,829,694 A | 5/1989 | Oasheim | |
| 4,858,634 A * | 8/1989 | McLeese | 135/126 |
| 4,864,770 A * | 9/1989 | Serio | 43/105 |
| 4,914,856 A | 4/1990 | Kennedy | |
| 4,951,333 A * | 8/1990 | Kaiser et al. | 135/126 |
| 5,056,172 A * | 10/1991 | Kaiser et al. | 135/126 |
| 5,059,463 A * | 10/1991 | Peters | 135/116 |
| 5,137,044 A * | 8/1992 | Brady | 135/126 |
| 5,218,781 A * | 6/1993 | Miller | 43/105 |
| 5,249,592 A * | 10/1993 | Springer et al. | 135/126 |
| 5,411,046 A * | 5/1995 | Wan | 135/126 |
| 5,478,273 A * | 12/1995 | Ives | 43/100 |
| 5,497,580 A | 3/1996 | Vanderplaats | |
| 5,579,799 A * | 12/1996 | Zheng | 135/126 |
| 5,625,978 A | 5/1997 | Streeper et al. | |
| 5,645,096 A * | 7/1997 | Hazinski et al. | 135/126 |
| 5,839,220 A | 11/1998 | Wass | |
| 5,943,807 A | 8/1999 | McPherson | |
| 6,092,544 A | 7/2000 | Zheng | |
| 6,109,282 A * | 8/2000 | Yoon | 135/126 |
| 6,199,229 B1 * | 3/2001 | Wong | 135/125 |
| 6,220,265 B1 | 4/2001 | Zheng | |
| 6,247,264 B1 | 6/2001 | Prosol | |
| 6,357,510 B1 * | 3/2002 | Zheng | 135/143 |
| 6,460,556 B2 | 10/2002 | Zheng | |
| RE37,924 E | 12/2002 | Kellogg et al. | |
| 6,502,596 B1 * | 1/2003 | Danaher | 135/126 |
| 6,550,180 B1 | 4/2003 | Le | |
| 6,591,544 B1 | 7/2003 | Christian | |
| 6,604,537 B2 * | 8/2003 | Zheng | 135/126 |
| 6,662,488 B1 * | 12/2003 | Heimbrock et al. | 43/55 |
| 6,668,847 B2 | 12/2003 | Zheng | |
| 6,705,039 B1 * | 3/2004 | Campbell | 43/7 |
| 6,783,016 B2 | 8/2004 | Wang | |
| 6,786,000 B1 * | 9/2004 | Hong | 43/105 |
| 6,830,170 B2 | 12/2004 | Abel | |
| 6,851,136 B2 * | 2/2005 | Brereton | 135/126 |
| 7,040,333 B1 * | 5/2006 | Ransom et al. | 135/126 |
| 7,152,733 B2 * | 12/2006 | Trickett | 135/126 |
| 7,174,584 B2 * | 2/2007 | Danaher | 135/126 |
| 7,225,823 B1 * | 6/2007 | Ransom et al. | 135/126 |
| 7,243,384 B2 * | 7/2007 | Le Gette et al. | 5/417 |
| 7,246,630 B1 * | 7/2007 | Ransom et al. | 135/126 |
| 7,313,887 B2 * | 1/2008 | Hibbs et al. | 43/105 |
| 7,365,967 B2 * | 4/2008 | Zheng | 361/680 |
| 7,533,486 B2 * | 5/2009 | Ribeiro De Matos | 43/105 |
| 2001/0013360 A1 * | 8/2001 | Gupta et al. | 135/126 |
| 2002/0139032 A1 * | 10/2002 | Campbell | 43/11 |
| 2004/0084448 A1 | 5/2004 | Huang | |
| 2004/0181995 A1 * | 9/2004 | Cheramie | 43/105 |
| 2006/0037553 A1 * | 2/2006 | Miller et al. | 119/497 |
| 2006/0112610 A1 * | 6/2006 | Philbrook | 43/105 |
| 2006/0288634 A1 * | 12/2006 | Wimbus et al. | 43/105 |
| 2007/0079858 A1 * | 4/2007 | Chu et al. | 135/126 |
| 2008/0113582 A1 * | 5/2008 | Campbell | 446/236 |
| 2008/0216388 A1 * | 9/2008 | Thorsen | 43/105 |

FOREIGN PATENT DOCUMENTS

| | | | | |
|---|---|---|---|---|
| FR | 2775871 A1 | * | 9/1999 | |
| GB | 2396092 A | * | 6/2004 | |
| JP | 07313016 A | * | 12/1995 | |
| JP | 08266190 A | * | 10/1996 | |
| JP | 2006109836 A | * | 4/2006 | |
| JP | 2006197801 A | * | 8/2006 | |
| JP | 2008011747 A | * | 1/2008 | |
| WO | WO 8707818 A1 | * | 12/1987 | |
| WO | WO 8904603 A1 | * | 6/1989 | |
| WO | WO 9418825 A1 | * | 9/1994 | |
| WO | WO 2006064293 A1 | * | 6/2006 | |
| WO | WO 2007078255 AL | * | 7/2007 | |

* cited by examiner

100

100

100

COLLAPSIBLE CRUSTACEAN TRAP

CROSS-REFERENCE TO RELATED APPLICATIONS

This application is a divisional of U.S. application Ser. No. 11/285,994, filed Nov. 23, 2005 now abandoned, which claims the benefit of U.S. Provisional Application No. 60/631,070, filed Nov. 26, 2004.

BACKGROUND OF THE INVENTION

The non-commercial trapping of crustaceans is a pastime enjoyed by thousands of people worldwide. One of the few inhibiting factors in this pursuit is the nature of the crustacean trap itself. It is often bulky and awkward to carry and store. The collapsible crustacean trap solves these problems. There are many collapsible crustacean traps on the market today but most of them do not form into the ultimate shape or size. The ultimate shape being a circular trap so that the crustaceans can easily circle and find the entrance. The ultimate size being large enough so that large amounts of bait can be placed in it and still have adequate separation from the outside wall causing the crustaceans to realize they must find an entrance to get to the food. Patented square/rectangular collapsing traps include inventions by Eric C. Wass (U.S. Pat. No. 706,299), Alan N. McKenzie (U.S. Pat. No. 571,264), John O. Jonason (U.S. Pat. No. 176,434) and Gerald J Cheramie (Patent Application 20040881995). These traps are often complicated to assemble and are not as efficient as circular traps (proven by the commercial designs). There are circular collapsible traps on the market like that envisioned by Charles Ponzo (U.S. Pat. No. 4,587,758) but they only incorporate a single stage of collapsing making it bulky for storing. Ladner Traps of Delta, British Columbia, Canada, also have a circular trap that collapses and folds in half. This design is an improvement on others but still lacks the assembled volume of the present invention and is considerably larger when collapsed in its storage state.

BRIEF SUMMARY OF INVENTION

The present invention, in its standard double hoop configuration, is superior to all existing collapsing traps as it is circular in design and easily has the best volume expansion ratio of approximately 25:1. Most collapsing traps have only one stage of collapsing, namely reducing its size in two dimensions only. The present invention adds another stage of collapsing to allow it to minimize in all dimensions. The present invention, because of its superior collapsibility, is well suited to applications where there are storage limitations such as in cruisers, sailboats, tenders, kayaks, canoes, floatplanes, automobiles, and recreational vehicles or when traveling in general.

The present invention, once assembled, can be deployed into the water and let down to settle on the seafloor/freshwater floor. A rope affixed to a bridal, which in turn is affixed to the trap, generally controls the deployment. A float can be attached to the upper end of the rope if the trap is to be left unattended.

The present invention is a portable frame and mesh trap defined by its unique collapsibility. Its collapsibility is obtained from the manipulation of a flexible hoop or hoops that typically cuts its height by 90% (for the double hoop embodiment) and its diameter by 50% (for all embodiments), bettering its storage ability. There are two main embodiments of this trap: single hoop (an open 'lift trap') and double hoop (similar to a standard enclosed circular trap). The uniqueness of the trap is derived mostly from the second stage in folding the trap for storage. The first stage, common in traps, is releasing struts to allow the top of the trap to nest with the bottom of the trap, reducing its size vertically. The typical process in stage two in collapsing the hoop(s) would be to grasp opposite sides (looking at the hoop(s) as a clock, grasp them at the 3 & 9 o'clock positions) and force them together with a slight twist to form a figure eight. A clamp may be used to secure the created waist. Fold the outside curves (originally at the 12 & 6 o'clock positions) of the figure eight toward one another until they are touching. A clamp may be used to secure the hoop(s) together at this point as well. The other necessary parts of the trap are incorporated into the resulting minimized package.

The present invention is distinct from all other traps in the method by which it is collapsed and conversely setup. The method is similar to the folding and storing of a band saw blade. It is also similar to the method defining the invention described by U.S. Pat. No. 4,815,784 for an automobile sunshade. In this patent a sunshield is collapsed by twisting and folding similar members to attain dramatically reduced size dimensions.

The primary configurations for the present invention would be for crabs, prawns, lobsters and crayfish. These traps, in slightly different configurations, can be used to catch and/or contain animals, fish and other crustaceans. The entrance means, as referred to in the Claims, can be any structure applied to the opening that allows the species to be captured (target species) to enter the trap and not be able to escape unless regulations require otherwise. These structures include, but are not restricted to: mesh funnels, swinging one-way gates and plastic overlapping fingers such as a neptune's trigger. Any species that are meant to be trapped by the present invention are referred to in the Claims as objects.

DETAILED DESCRIPTION OF DRAWINGS

Although the disclosure hereof is detailed and exact to enable those skilled in the art to practice the invention, the physical embodiments herein disclosed merely exemplify the invention that may be embodied in other specific structure.

While the preferred embodiment has been described, the details may be changed without departing from the invention, which is defined by the Claims.

Figure 1:
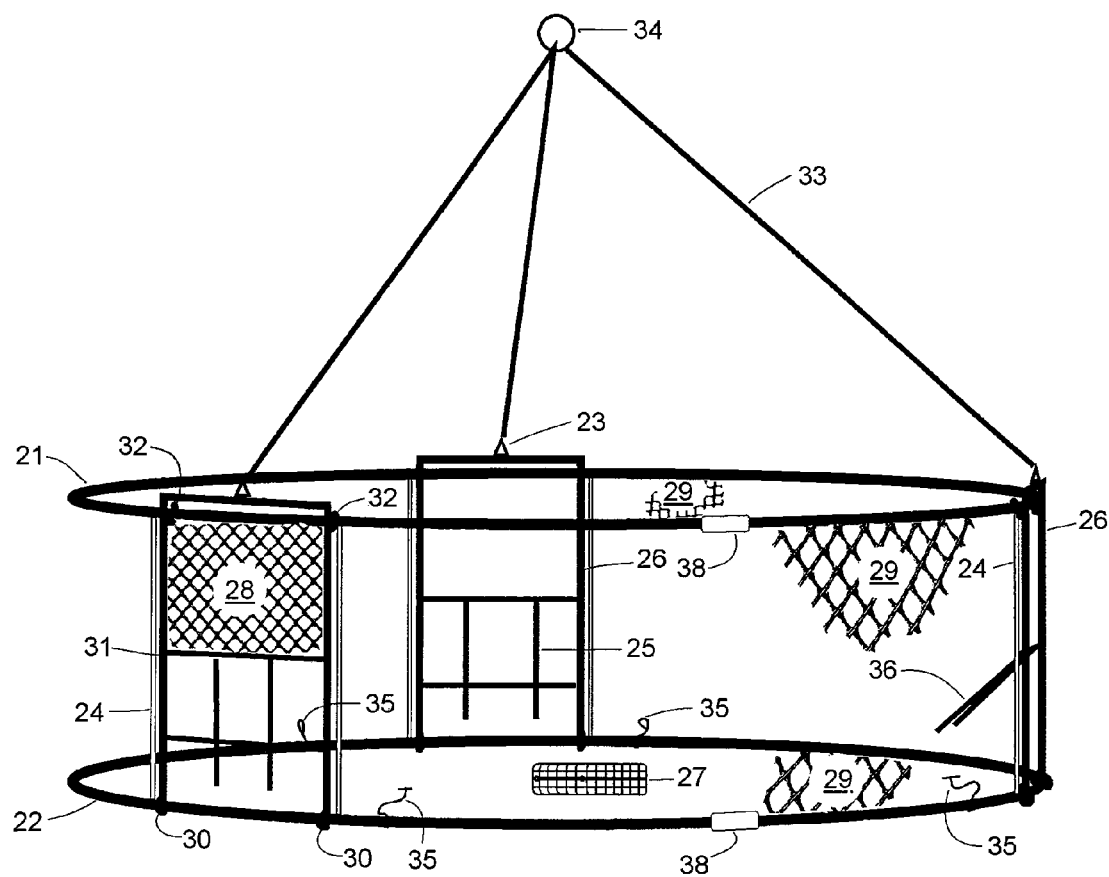
FIG. 1 illustrates a complete view of crab trap 100, the primary embodiment of the present invention when fully assembled.

FIG. 1 illustrates a collapsible crab trap 100, the primary embodiment of the present invention. As shown in FIG. 1 the crab trap 100 is substantially formed by two 1×19 strand stainless steel wire ropes. The ends of each of the wire ropes are joined together by a crimped stainless steel tube, crimp 38, such that the two wire ropes form a top hoop 21 arid bottom hoop 22. Hoop 21 and Hoop 22 are sited in the claims as annular members. In its assembled state, FIG. 1, crab trap 100 has the top hoop 21 positioned parallel directly above the bottom hoop 22. Top hoop 21 and bottom hoop 22 are held separated by struts. Struts are named in the claims as a structural means. The struts comprise three stainless steel frames, frames 26, positioned equidistantly around the hoops. Frames 26 consist of stainless steel rod running vertical from a binge 30 on the bottom hoop 22 to the top hoop 21, followed by a 90° bend to follow the top hoop 21 and finally, a further 90° bend downward connect with hinge 30 on the bottom hoop 22. Frame 26 is sited as a structural means in the Claims. Hinge 30 consists of a loop in the stainless steel rod of frame 26 around bottom hoop 22. There would be six hinges 30, two on the bottom of each of the three frames 26. The frames 26 are fastened to the bottom hoop 22 by hinge 30 and to the top hoop 21 by hanger 32. Hanger 32 is a facet of frame 26, located one in each top corner of the frame 26 and facing inward, so as to hold up top hoop 21. As there are six hinges 30 on the bottom of the frames there are six hangers 32 at the top. Elastomeric tension lines 24 run adjacent to each side of frames 26 and are connected to the top hoop 21 and bottom hoop 22. Elastomeric tension lines 24 provide tension between the top hoop 21 and bottom hoop 22 so that the top hoop remains firmly in hangers 32. This tension also creates rigidity in the trap. An alternate frame 26 can be permanently attached to the top flexible hoop 21 and the bottom flexible hoop 22 and have the ability to fold to allow the top flexible hoop 21 to lie on the bottom flexible hoop 22. In the Claims, this arrangement is referred to as struts that are foldable.

Crab trap 100 in FIG. 1 comprises of three stainless steel gates 25 that are suspended on gate hinges 31 on frames 26. Gate hinges 31 on frames 26 are typical of a hinging means referred to in the Claims. Gates 25 swing inward to provide ingress for crabs but will block egress by not swinging outward. Details of the gates 25 will be given with description of FIG. 4. Gate 36 illustrates the swinging gate in the open position. Gate 36 is referred to in the Claims as a one-way swinging gate.

FIG. 1 illustrates the preferred manner of enclosing the trap. Mesh netting 29 would be used to enclose the top and bottom of crab trap 100 as well as portions of the sides outside the frames 26. Biodegradable mesh netting 28, which will degrade within weeks in a sub marine environment, may be employed in the top half of the area within frame 26 to allow crustaceans to exit the trap if it is abandoned or lost.

FIG. 1 illustrates a bait container 27 that is placed inside the trap and clipped onto the mesh netting 29 near the middle of the bottom hoop 22. The bait container would generally be comprised of a plastic mesh envelope that crustacean attractants could be placed within.

FIG. 1 also illustrates the components of crab trap 100 necessary for its deployment and retrieval. Lifting ring 34 is the upper terminus for the three ropes forming the lifting bridal 33. The lifting bridal 33 is attached to the trap by stainless steel lifting points 23, which are welded to the top of frame 26. A retrieval line or pole can be attached to lifting ring 34 to deploy and retrieve the trap.

FIG. 1 illustrates clasps 35 at four equidistant points around the bottom hoop 22. They are molded plastic clasps that fastened together to aid in the collapsing process.

Figure 2A:
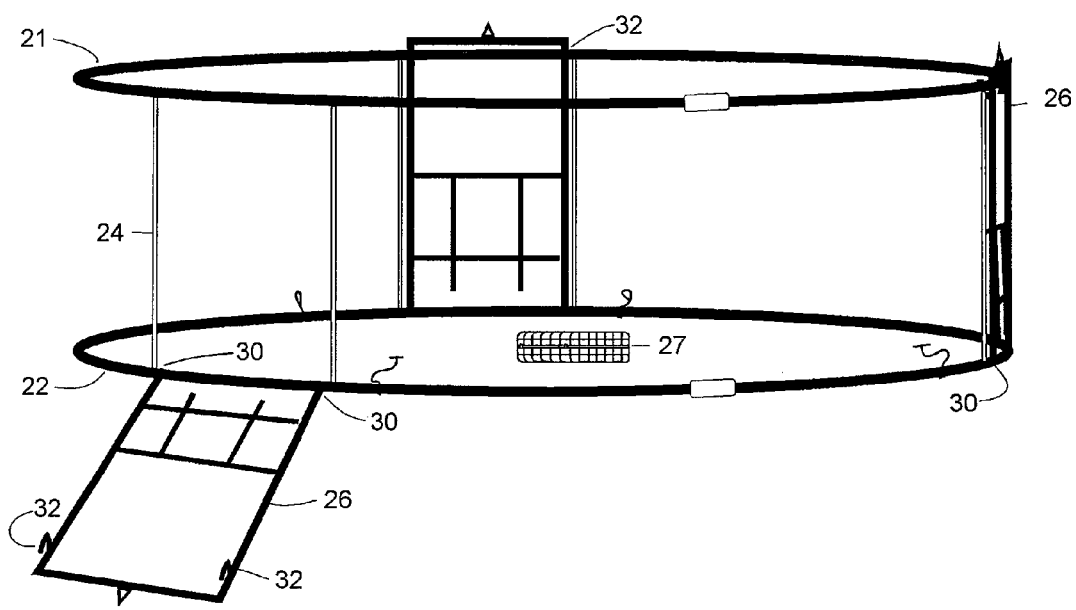
FIG. 2A illustrates the first step of collapsing crab trap 100. This and subsequent drawings may not depict netting in order that other prime features are easily identified.
Figure 2B:
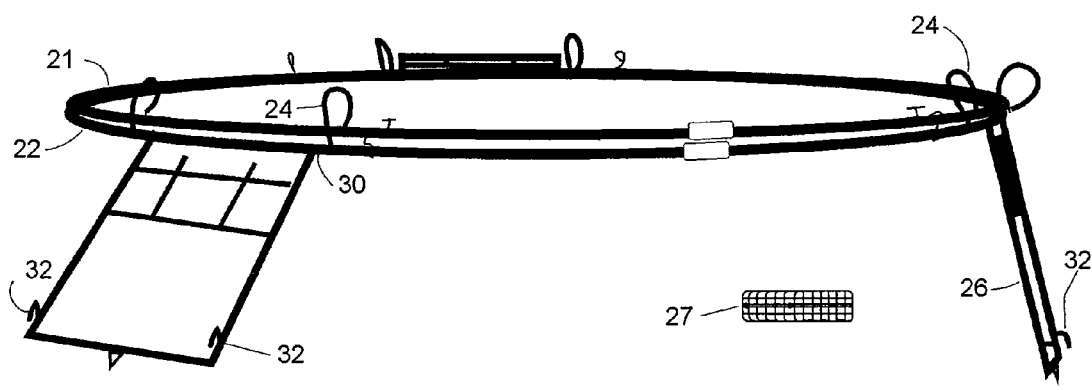
FIG. 2B illustrates the second step of collapsing crab trap 100.

Most collapsing crab traps have only one stage of collapsing, namely reducing their size in two dimensions only. Crab trap 100 adds another stage of collapsing to allow it to minimize in all dimensions. FIG. 2A and 2B illustrate the first stage. FIG. 3A, 3B, 3C and 3D illustrate the second stage.

FIG. 2A and 2B illustrate the first two steps in collapsing crab trap 100. The collapsing process is a key in the uniqueness of the present invention. Top hoop 21 must be lowered onto bottom hoop 22 before the trap is flexed and than folded into its storing configuration, which is its most minimized form. To do this, the top hoop 21 must be lifted off and inward of the six hangers 32, there being two hangers on each frame 26. The frames 26 are than folded out and down, hinging on hinges 30 on the bottom hoop 22. The best time to remove crabs and the bait container is after the first frame is swung away as there is good access to the interior of the trap and it will still be in an erect state. Once all the frames 26 have been folded out, the top hoop 21 will naturally drop onto the bottom hoop 22. FIG. 2B illustrates this stage in collapsing. The elastomeric tension lines 24 become slack as the top hoop 21 descends to the lower hoop 22. The removable bait container 27 is shown outside the trap in FIG. 2B.

Figure 3A:
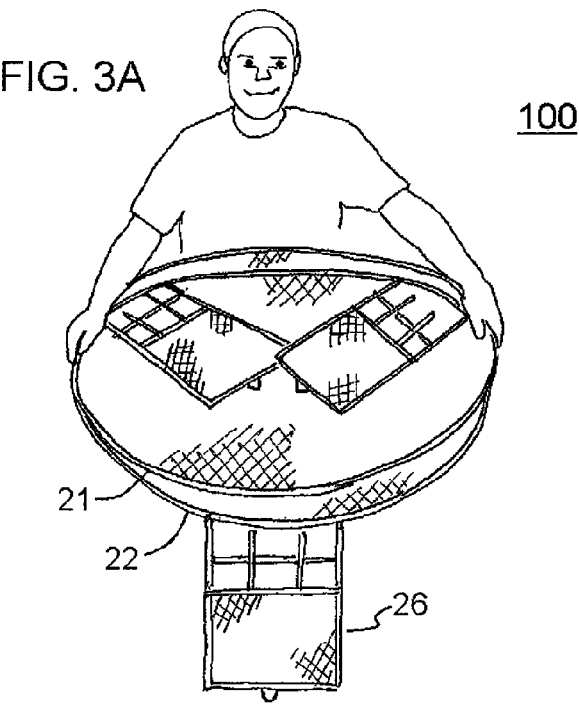
FIG. 3A illustrates the continuation of the collapsing process from the second step to the third.
Figure 3B:
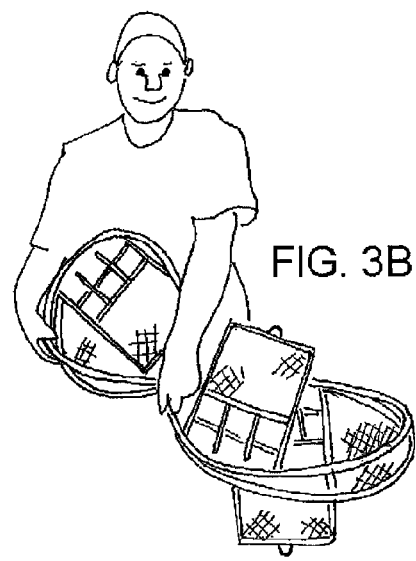
FIG. 3B illustrates the continuation of the collapsing process from the third step to the fourth step.
Figure 3C:
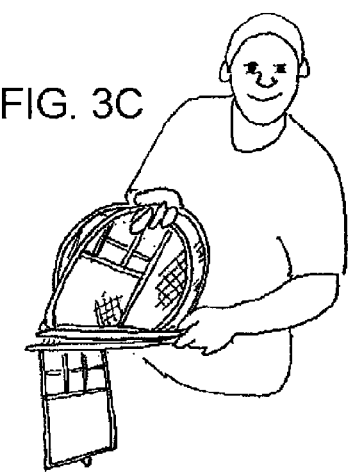
FIG. 3C illustrates the continuation of the collapsing process from the fourth step to the fifth step.
Figure 3D:
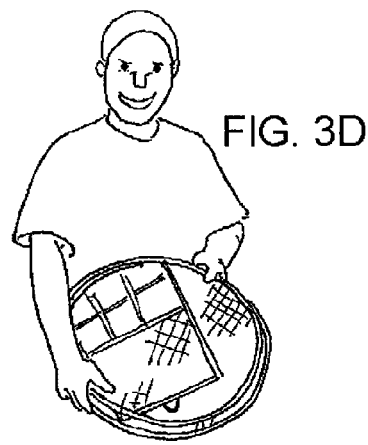
FIG. 3D illustrates the continuation of the collapsing process from the fifth step to the sixth step.

FIG. 3A, 3B, 3C and 3D illustrate the continuation of the procedure to minimize crab trap 100 illustrated in FIG. 2A and 2B. The typical process in these steps in collapsing the hoops would be to grasp opposite sides of the two aligned hoops 21 & 22, indicated by the clasp 35 positions in FIG. 1, (looking at the hoops as a clock, grasp them at 3 & 9 o'clock positions) as shown in FIG. 3A and force them together until clasps 35 can be fastened. Fastening the opposing clasps carries the force required to flex the wire hoops inward allowing an easy transition to twisting the hourglass shaped hoops into a figure eight or lemniscates structure as shown in FIG. 3B. Fold the outside curves (originally at 12 & 6 o'clock positions) of the figure eight toward one another until they are touching as shown in FIG. 3C. The two remaining clasps may now be secured. Frames 26 can now be folded on top and below. The resulting configuration is the complete minimization of crab trap 100 as shown in FIG. 3D.

Figure 4:
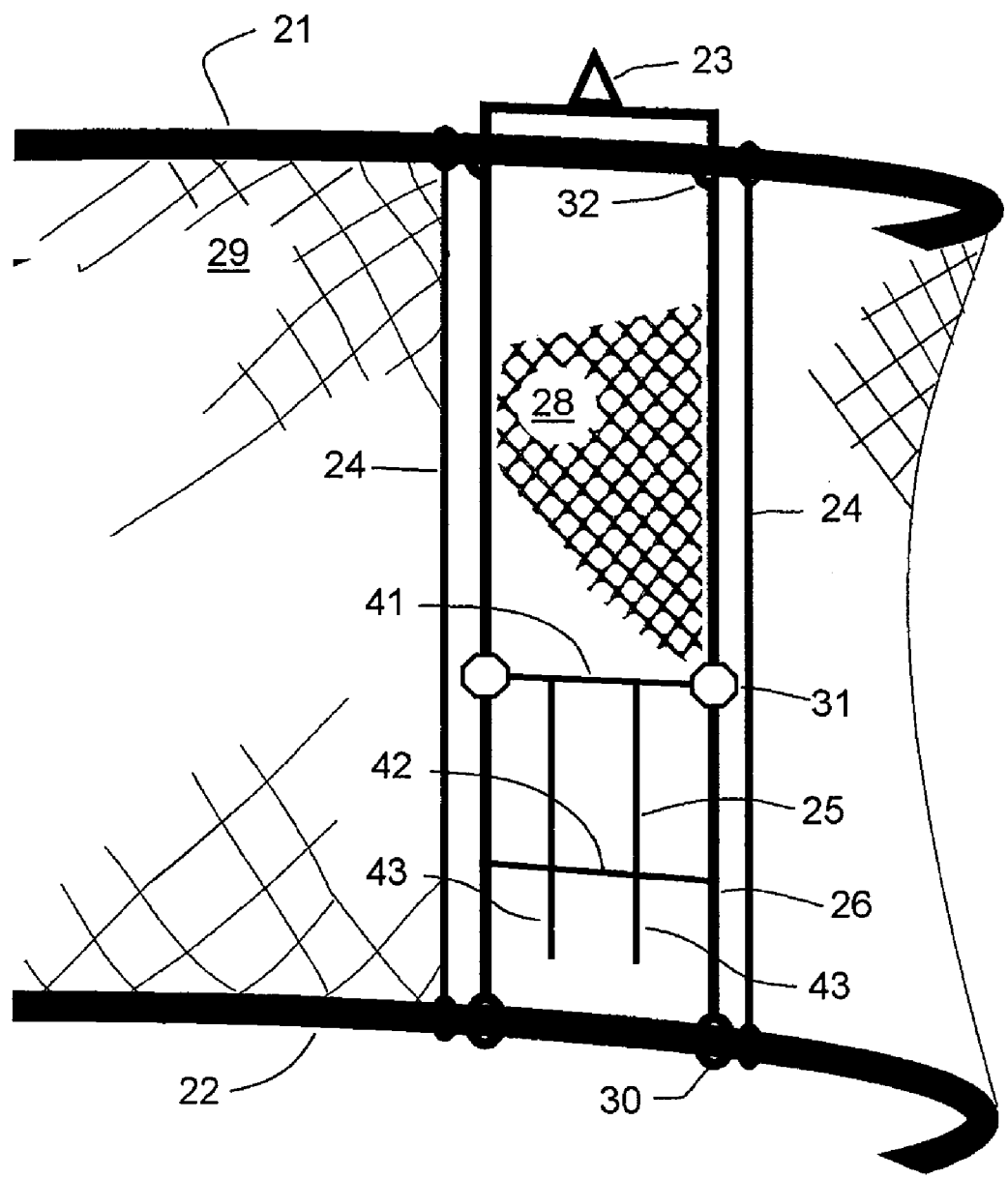
FIG. 4 illustrates a large-scale diagram of the frame struts and gates used in crab trap 100. This is an example of the structural means sited in the Claims.

FIG. 4 comprises a detailed illustration of a frame 26 of crab trap 100. Frame 26 supports gate 25, through which crustaceans enter the trap. The three-sided frame 26 is hinged on the bottom hoop 22 by hinge 30. The top hoop 21 is secured by tension lines 24 in hangers 32 on each side at the top of frame 26. The top of gate 25 is a stainless rod 41 that pivots on gate hinges 31. Two separated vertical stainless steel rods 43 are welded at their top ends to rod 41. Bisecting and welded to the two vertical rods 43 is stainless steel rod 42. Its span exceeds that of the width of the frame 26 so that it cannot swing outside the trap thus preventing egress of the captured crustaceans. The top hoop 21, bottom hoop 22 and tension lines 24 are threaded through mesh netting 29. Biodegradable mesh netting 28 is used in the top half of frame 26 to prevent the long-term confinement of crustaceans in the event that the crab trap is abandoned or lost.

Figure 5:
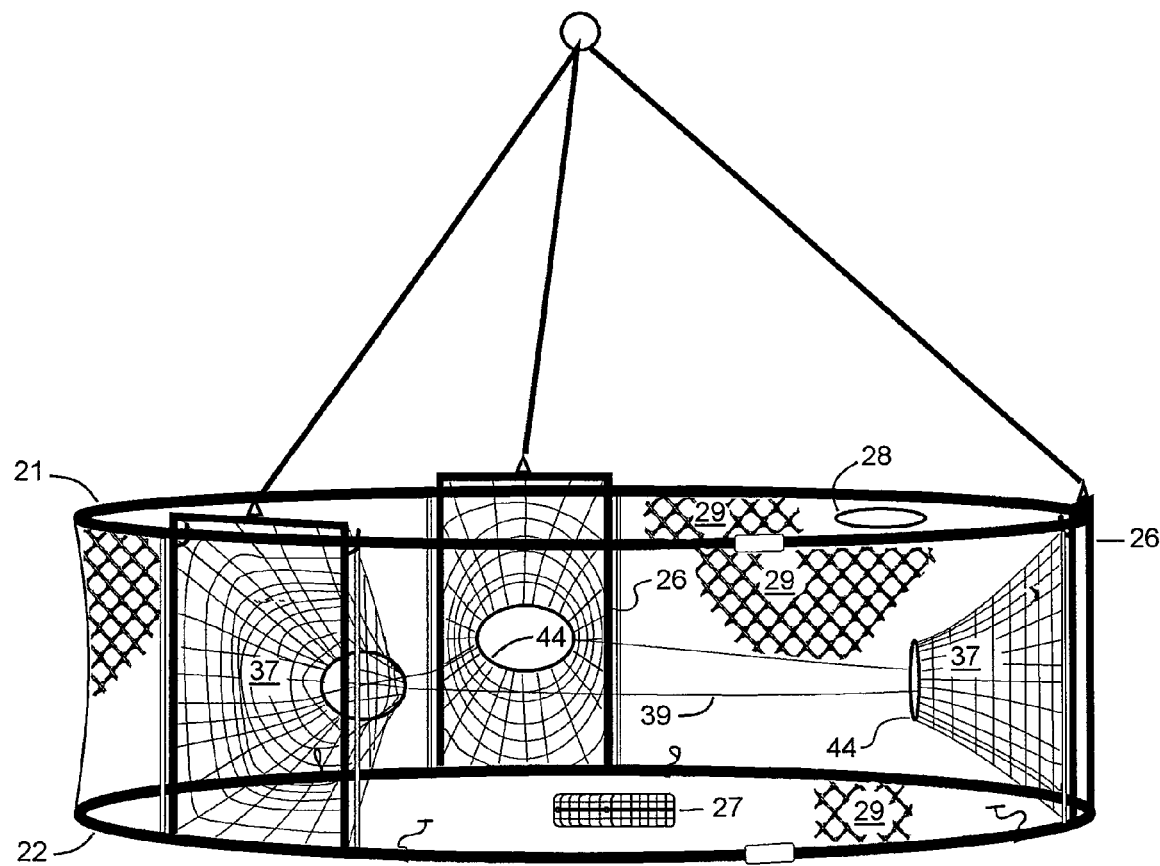
FIG. 5 illustrates a secondary embodiment of the present invention, being crab trap 200, wherein mesh funnels are incorporated instead of gates to create ingress and prevent egress of objects to be captured.

FIG. 5 illustrates crab trap 200, the secondary embodiment of the present invention, wherein the primary components of the crab trap remain the same except for gates 25 and degradable mesh 28 (illustrated in FIG. 1), which are replaced with small mesh netting formed to the shape of a funnel 37 in a horizontal axis. The entrance of the trap is formed by threading the large diameter end of the mesh funnel onto the frame 26 and the small diameter end onto a stainless steel ring 44 positioned inside the trap midway between the top hoop 21 and bottom hoop 22. The ring 44 is kept suspended by lateral tension introduced by internal elastomeric tension lines 39. Crabs follow the scent emitted from the bait trap 27 into the funnel 37, climbing up a gentle slope, and passing through ring 44 into the interior of the trap. A biodegradable mesh 28 exit would exist on the top of the trap stitched into standard mesh netting 29.

Crab trap 200 is collapsed, as is crab trap 100, by removing the frames 26. The funnels are fully deformable once the tension lines 39 are released. The full procedure to minimize the trap is the same as crab trap 100 (illustrated with FIGS. 2A, 2B, 3A, 3B, 3C and 3D).

Both crab trap 100 and 200 can easily be transformed into other crustacean traps by varying the mesh netting size and strength. Prawns could be caught with smaller mesh incorporated into the design whereas lobster would need a stronger mesh. Typically, the flexible mesh described in the Claims is nylon or polyester netting. The biodegradable mesh is typically cotton netting.

Figure 6:
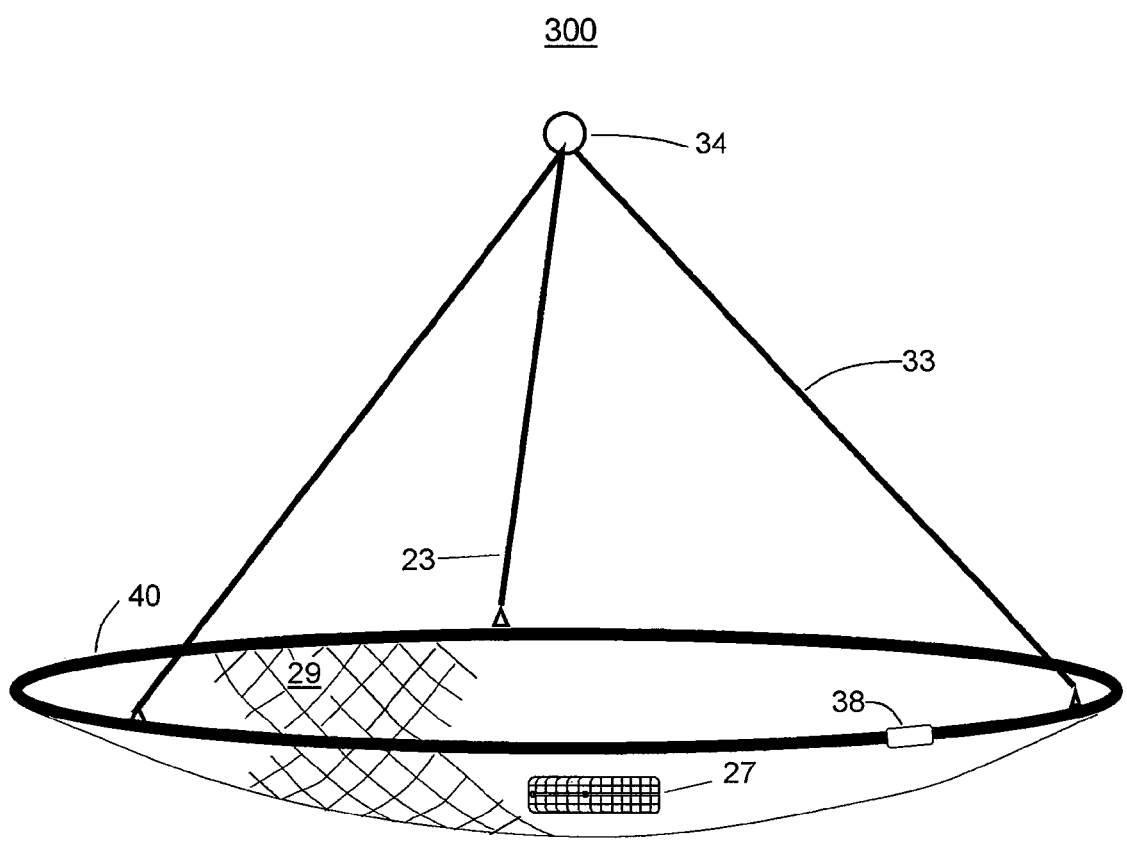
FIG. 6 illustrates a tertiary embodiment of the present invention, being crab trap 300, wherein a single hoop is used to create what is commonly known as a 'lift trap'.

FIG. 6 illustrates crab trap 300, the simplest embodiment of the present invention. Commonly called a lift trap, it is widely used on docks or areas where there is an abundance of crab. Crab trap 300 consists of a stainless steel wire rope formed into a hoop 40 where the two ends are joined with a stainless steel crimp 38. Hoop 40 is threaded through the perimeter of mesh netting 29. The mesh netting should form a dip or pocket so that, when it is raised from the bottom of the seafloor, it makes it difficult for the crabs to escape over the perimeter, especially if the trap is brought up quickly forcing water pressure on them. Crab trap 300 may consist of two hoops arranged in a manner to form a short mesh wall to prevent the escape of the target species when it is lifted.

Crab trap 300 collapses by the same method as crab trap 100 in FIGS. 3A, 3B, 3C and 3D only easier as there is only one hoop to flex and fold.

Crab trap 300, as illustrated in FIG. 6, utilizes a bait trap 27, and the same lifting mechanisms as crab trap 100 and 200, namely lifting points 23, bridal 33, and lifting ring 34. A line, in turn, can be attached to lifting ring 34 to aid in deployment.

Crab traps 100, 200 and 300 have structures primarily made of stainless steel, as this material is better suited to the marine environment then most materials as it is less prone to degradation. However, composite materials, plastics, reinforced plastics/rubber and a combination of steel and plastics could easily be used to make any part of the trap including the flexible hoops. These traps are scalable in size to fit different applications.

I claim:

1. A method of collapsing a collapsible trap comprising:
providing a trap comprising an upper resilient hoop, a lower resilient hoop, one or more gates to allow for entry by animals into said trap, and two or more detachable hinged connectors which are attached to and retain said upper hoop and said lower hoop in a spaced, substantially parallel relationship when said trap is extended, each of said connectors also being attached to said one or more gates to allow for entry by animals into said trap, said one or more gates arranged perpendicularly to said upper hoop and said lower hoop when said trap is extended;
detaching said two or more connectors from one of said upper hoop and said lower hoop;
collapsing said upper hoop directly on said lower hoop such that said upper hoop and said lower hoop form a substantially coaxial arrangement;
compressing opposite sides of said substantially coaxial arrangement towards one another to form a substantially hourglass configuration;
continuing compressing said opposite sides until said opposite sides contact one another, forming a substantially lemniscate structure comprising a first lobe and a second lobe;
twisting said first lobe 180° with respect to said second lobe about a longitudinal axis of said substantially lemniscate structure; and
folding said first lobe onto said second lobe about a centre of said substantially lemniscate structure.

2. The method of claim 1, further comprising the step of securing said first lobe to said second lobe.

3. The method of claim 1, wherein the step of detaching said two or more connectors from one of said upper hoop and said lower hoop comprises detaching said two or more connectors from said upper hoop.

4. The method of claim 3, wherein the step of detaching said two or more connectors from said upper hoop further comprises the step of folding said two or more connectors away from a centre of said lower hoop.

5. The method of claim 1, wherein the step of detaching said two or more connectors from one of said upper hoop and said lower hoop comprises detaching said two or more connectors from said lower hoop.

6. The method of claim 5, wherein the step of detaching said two or more connectors from said lower hoop further comprises the step of folding said two or more connectors away from a centre of said upper hoop.

7. The method of claim 1, further comprising the step of folding at least one of said two or more connectors towards centres of said first lobe and said second lobe.

8. The method of claim 1, wherein the step of collapsing said upper hoop directly on said lower hoop such that said upper hoop and said lower hoop form a substantially coaxial arrangement further comprises the step of folding at least one of said two or more connectors towards a centre of said substantially coaxial arrangement.

9. A method of collapsing a collapsible trap comprising:
providing a trap comprising an upper resilient hoop, a lower resilient hoop, one or more gates to allow for entry by animals into said trap, and two or more detachable hinged connectors which are attached to and retain said upper hoop and said lower hoop in a spaced, substantially parallel relationship when said trap is extended, each of said connectors also being attached to said one or more gates, said one or more gates arranged perpendicularly to said upper hoop and said lower hoop when said trap is extended;
detaching said two or more connectors from one of said upper hoop and said lower hoop;
collapsing said upper hoop directly on said lower hoop such that said upper hoop and said lower hoop form a substantially coaxial arrangement;
compressing opposite sides of said substantially coaxial arrangement towards one another to form a substantially hourglass configuration;
connecting said opposite sides together to form a substantially lemniscate structure comprising a first lobe and a second lobe;
twisting said first lobe 180° with respect to said second lobe about a longitudinal axis of said substantially lemniscate structure; and
folding said first lobe onto said second lobe about a centre of said substantially lemniscate structure.

10. The method of claim 9, further comprising the step of securing said first lobe to said second lobe.

11. The method of claim 9, wherein the step of detaching said two or more connectors from one of said upper hoop and said lower hoop comprises detaching said two or more connectors from said upper hoop.

12. The method of claim 11, wherein the step of detaching said two or more connectors from one of said upper hoop and said lower hoop further comprises the step of folding said two or more connectors away from a centre of said lower hoop.

13. The method of claim 9, wherein the step of detaching said two or more connectors from one of said upper hoop and said lower hoop comprises detaching said two or more connectors from said lower hoop.

14. The method of claim 13, wherein the step of detaching said two or more connectors from said lower hoop further comprises the step of folding said two or more connectors away from a centre of said upper hoop.

15. The method of claim 9, further comprising the step of folding at least one of said two or more connectors towards centres of said first lobe and said second lobe.

16. The method of claim 9, wherein the step of collapsing said upper hoop directly on said lower hoop such that said upper hoop and said lower hoop form a substantially coaxial arrangement further comprises the step of folding at least one of said two or more connectors towards a centre of said substantially coaxial arrangement.

17. A method of collapsing a collapsible trap comprising:
providing a trap comprising an upper resilient hoop, a lower resilient hoop, one or more gates to allow for entry by animals into said trap, and two or more detachable hinged connectors which are attached to and retain said upper and lower hoop in spaced, substantially parallel relationship when said trap is extended, each of said connectors also being attached to said one or more gates, said one or more gates arranged perpendicularly to said upper hoop and said lower loop when said trap is extended;

detaching said two or more connectors from one of said upper hoop and said lower loop;

folding said two or more connectors and said gates away from centres of said upper hoop and said lower hoop;

collapsing said upper hoop directly on said lower loop such that said upper hoop and said lower hoop form a substantially coaxial arrangement;

compressing opposite sides of said substantially coaxial arrangement towards one another to form a substantially hourglass configuration;

connecting said opposite sides together to form a substantially lemniscate structure comprising a first lobe and a second lobe;

folding at least one of said two or more connectors towards a centre of one of said first lobe and said second lobe;

twisting said first lobe 180° with respect to said second lobe about a longitudinal axis of said substantially lemniscate structure;

folding said first lobe onto said second lobe about a centre of said substantially lemnsicate structure; and folding the remaining of said two or more connectors towards said first lobe's and said second lobe's centres.

* * * * *